July 3, 1956  B. BJERKAS  2,753,388
CLAMP MEMBERS FOR ELECTRODE HOLDER
Filed March 29, 1955
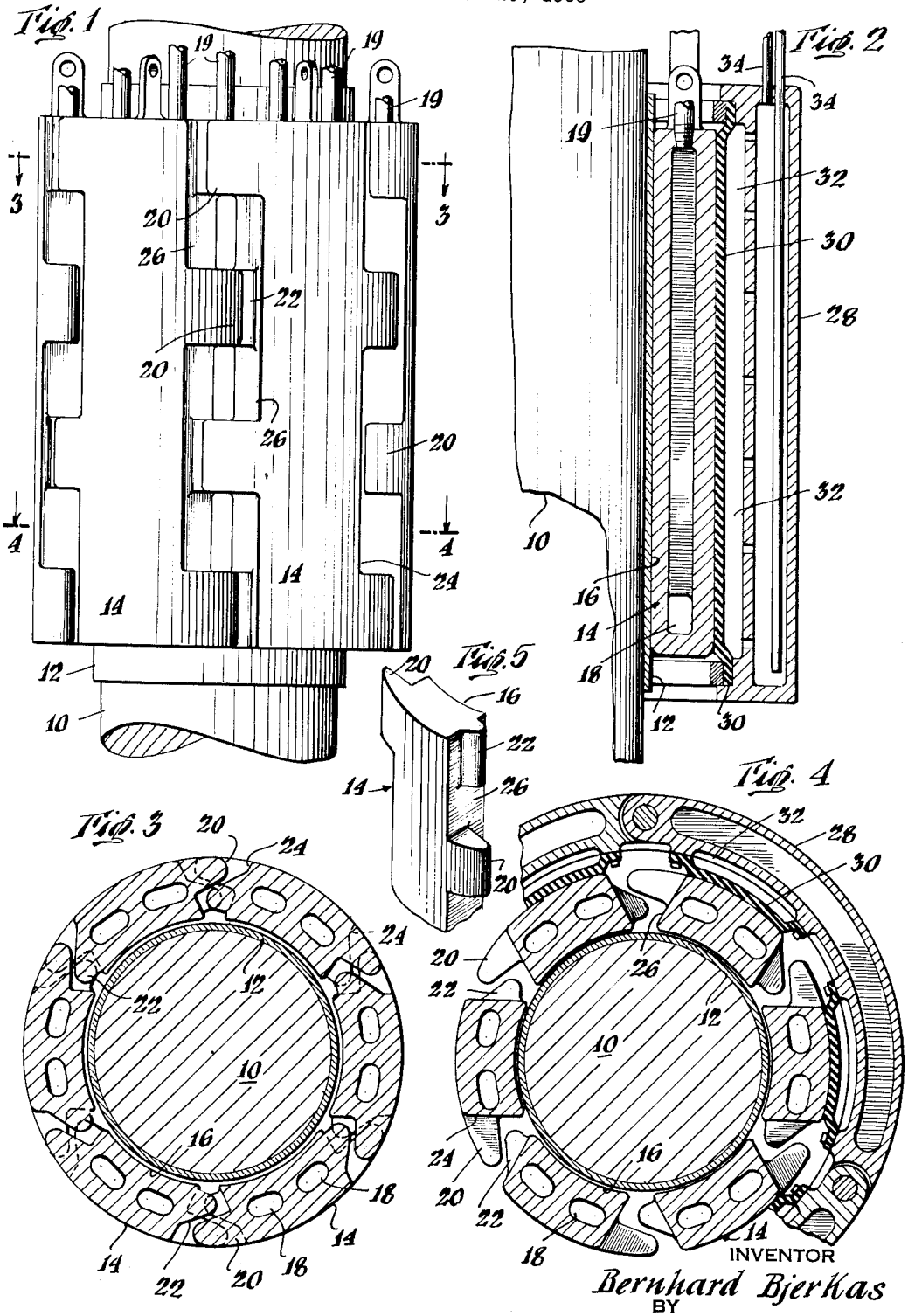
INVENTOR
Bernhard Bjerkas
BY
Eyre, Mann & Burrows
ATTORNEYS

United States Patent Office 2,753,388
Patented July 3, 1956

2,753,388

CLAMP MEMBERS FOR ELECTRODE HOLDER

Bernhard Bjerkas, Kristiansand S, Norway, assignor to Elektrokemisk A/S, Oslo, Norway, a corporation of Norway Application March 29, 1955, Serial No. 497,517

Claims priority, application Norway March 31, 1954

4 Claims. (Cl. 13—16)

This invention relates to clamp members for supporting an electrode that are so interlocked in a ring of variable diameter around the electrode that no one clamp member can leave the ring and penetrate into the electrode.

The electrode in electric smelting furnaces is ordinarily supported in a holder of the type that includes an outside ring having pressure means therein which bear against clamp members positioned around the electrode. The electrode is of the continuous type and during operation of the furnace the electrode is periodically lowered down through the clamp members of the holder. This is done by slightly relaxing the grip of the clamp members so that the electrode will slide slowly and evenly down into the furnace. Electrode holders of this type are described in United States Patent No. 2,673,227 and in my United States patent application Serial No. 472,972, filed December 3, 1954.

As there described, clamping pressure of the electrode holder is controlled by means of flexible members positioned between the clamp members and outside ring of the holder. Fluid under pressure supplied to the holder causes the flexible members to expand and force the clamp members in against the electrode casing with sufficient force to support the electrode without slipping.

The electrode clamp members and ring of the holder are water-cooled and they ordinarily protect the flexible members from the heat of the furnace. But it sometimes happens that the electrode paste is unbaked and soft and when this occurs the thin metallic electrode casing may give way at its weakest point and the clamp member at this point will then press further into the electrode. If a clamp presses far enough into the electrode it will separate from the ring of the holder and expose the flexible member to the heat of the furnace. The flexible member which is ordinarily made of rubber may thereby be destroyed, making operation of the furnace extremely difficult.

According to the present invention the clamp members of the holder have been locked together in a ring of variable diameter around the electrode by means of projections or teeth positioned along the sides of each clamp member and the teeth are so interlocked that no one clamp member can leave the ring and penetrate the electrode to the extent that the flexible members are exposed to the heat of the furnace. Another advantage of this arrangement of the teeth is that fluid clamping pressure need not be synchronized and uniform for each individual clamp member since the clamp with the highest pressure will transmit some of its pressure to adjacent clamps whereby clamping pressure is at all times evenly distributed around the ring.

The present invention may be readily understood by reference to the accompanying drawing in which:

Fig. 1 is a front elevational view of the electrode contact clamp members and interlocking teeth;

Fig. 2 illustrates the way the outside ring of the holder fits against the clamp members of Fig. 1. The outside ring is in section to illustrate its construction;

Fig. 3 is a sectional view taken on line 3—3 of Fig. 1 which shows the arrangement of the interlocking teeth;

Fig. 4 is a similar view taken on line 4—4 of Fig. 1 but in this view a portion of the outside ring of the holder of Fig. 2 is shown as it appears in section against the clamp members of Fig. 1; and Fig. 5 is a perspective view illustrating a portion of the side edge of a clamp member.

In the drawings, 10 is the electrode, 12 its casing, and 14 the clamp members here shown with six members in the ring around the electrode. Adjacent clamp members have a small space between them so that the ring may be tightened to exert sufficient clamping pressure for supporting the weight of the electrode. The inside of the clamp members is preferably a curved surface 16 so that the clamp will fit snugly against the surface of the electrode. Each clamp member is hollow at 18 for the circulation of cooling water but this is not necessary if the clamp is to be located away from the intense heat of the furnace. Pipes 19 supply cooling water to the clamp and these are ordinarily made of copper and they also serve to transmit electric current to the clamp member.

A plurality of long and short projections or teeth 20 and 22, respectively, are positioned along each side 24 of the clamp members and there is a space 26 between each projection. The long and short projections 20 and 22 alternately occur along the side of the clamp, that is, there is a long projection 20, a space 26, then a short projection 22, a space 26 and thereafter the sequence is repeated, a long projection 20, a space 26, etc. The general arrangement of the projections and spaces along opposite sides of each clamp member is the same but the order of the sequence is reversed so that the position of a long projection on one side of the clamp member corresponds to the position of a short projection on the opposite or second side of the same clamp member.

As shown in the drawings, by alternating the long and short projections 20 and 22, respectively, along one side of the clamp member and by positioning the projections in a corresponding position but in reverse order on the second side of the clamp member, an interlocking arrangement is achieved in the ring of clamp members whereby no one member can leave the ring. The arrangement is such that the long projections positioned along the side of one clamp member overlap the short projections positioned along the adjacent side of a second clamp member, and the long projections positioned along the side of the second member in turn overlap the short projections of the first member so that neither the first nor the second clamp member can leave the ring and penetrate the electrode. At the same time, if the pressure of one clamp member exceeds that of the adjacent members the extra pressure will be evenly distributed around the ring.

Spaces 26 between the projections are made at least equal to the height of a projection as measured along the side edge of the clamp and all of the projections are here shown with uniform height so that a clamp member may be readily removed from the ring by lifting it up and by sliding its projections out through the spaces of the adjacent clamp members. In the preferred form of my invention shown, the long projections 20 form a continuation of the outside surface of each clamp member and the short projections are positioned inwardly away from the outside edge so that the outside surface of the ring of clamp members will be relatively smooth. Although this is preferred, it is not necessary and the exact position of the projections may be changed without departing from the spirit and scope of the invention Figs. 2 and 4 illustrate one way in which clamping pressure of the holder for an electrode can be applied to the ring of clamp members of Fig. 1. For the purpose of illustration the outside pressure ring for the clamp members was selected from my United States patent application Serial No. 472,972 and the construction of the ring is identical with that disclosed in the patent application. As shown in the drawings the outside pressure ring member 28 carries a plurality of flexible members 30 positioned around electrode 10 with a flexible member in contact with each clamp member 14. Ring member 28 does not expand in the assembly and as a result when fluid pressure is supplied to chamber 32 by means of pipes 34, the flexible members expand and push clamp members 14 in against the electrode with sufficient force so that the clamp members support the electrode without slipping. Since the construction and operation of pressure ring member 28 follows that of the one described in my United States patent application Serial No. 472,972, the details of its construction will not be repeated herein. It will be understood that other fluid pressure devices may be used in place of the one illustrated in Figs. 2 and 4. For example, the flexible bags disclosed in United States Patent No. 2,673,227 may be employed, or if desired, any of the other clamping devices ordinarily employed in the holder for an electrode may be used such as, for example, the spring-loaded clamping devices described in United States Patent No. 2,668,183.

It will be understood that it is intended to cover all changes and modifications of the preferred embodiment of the invention herein chosen for the purpose of illustration which do not constitute departures from the spirit and scope of the invention.

What I claim is:

1. In combination with an electrode of the continuous type supported in a holder arranged around the electrode, a plurality of clamp members arranged in a ring of variable diameter around the electrode, each of said members having a plurality of long and short projections positioned along the sides of the individual members with a space between each projection which is at least equal to the height of a projection adjacent the space, said long and short projections being so arranged that they alternately occur along the side of the clamp member with the alternating arrangement along one side being the reverse of the alternating arrangement along the second side of the member so that the position of a long projection at one side of the clamp member corresponds to the position of a short projection at the second side of the clamp, and said long projections being adapted to overlap the short projections of adjacent clamp members in the ring whereby the clamp members may be locked around the electrode so that no one clamp member can leave the ring and penetrate into the electrode alone and whereby clamping pressure of the individual clamp members is evenly distributed around the ring.

2. A structure as specified in claim 1 in which the height of all of the projections is the same.

3. A clamp member for an electrode holder having a long and a short projection positioned on each side of the member with the long projection on one side being in a corresponding position to the short projection on the second side and the short projection on the first side being in a corresponding position to the long projection on the second side whereby a plurality of the clamp members may be locked in a ring around an electrode with the long projections overlapping the short projections of adjacent clamp members in the ring so that clamping pressure brought to bear against any one clamp member will be evenly distributed around the ring.

4. A structure as specified in claim 3 in which each of the projections is separated by a space equal to the height of one of the projections adjacent the space.

References Cited in the file of this patent

UNITED STATES PATENTS

| | | |
|---|---|---|
| 2,551,420 | Conti | May 1, 1951 |
| 2,668,183 | Foyn | Feb. 2, 1954 |
| 2,671,816 | Foyn | Mar. 9, 1954 |
| 2,673,227 | Hubert | Mar. 23, 1954 |